UNITED STATES PATENT OFFICE.

WILLIAM PITT CLOTWORTHY, OF BALTIMORE, MARYLAND.

PACKING BAKING-POWDERS.

SPECIFICATION forming part of Letters Patent No. 462,206, dated October 27, 1891.

Application filed September 13, 1890. Serial No. 364,885. (No specimens.)

*To all whom it may concern:*

Be it known that I, WILLIAM PITT CLOTWORTHY, a citizen of the United States, residing at the city of Baltimore, in the State of Maryland, have invented a new and useful Improvement in the Packing of Baking-Powders; and I do hereby declare that the following is a full, clear, and exact description of my invention, which will enable others skilled in the art to which it appertains to put up and pack the same by my novel method.

My invention relates to an improvement in packing baking-powders, which I accomplish by so combining the constituents that no loss of aerating power will take place by the acid constituent acting on the carbonated alkali.

At the present time the universal practice among the manufacturers of the baking-powders of commerce is to mix the acid, the carbonate, and the starch or flour all together. The starch or flour is used to prevent the rapid deterioration of strength necessarily caused by reason of the action of the acid on the carbonate. Experience has proved that the starch or flour only serves to retard deterioration, and that it is simply a question of time when the whole strength will have been lost. This is particularly the case when the acid phosphate of lime and the bicarbonate of soda are used. The acid phosphate of lime is, by all scientific authorities on the subject, conceded to be the best acid for bread-making.

To carry my invention into effect I arrange the constituents in layers or strata, placing between the acid and the carbonated alkali a layer or stratum of starch or flour or other suitable or farinaceous matter. This effectually separates the acid from the carbonate, and consequently no appreciable loss of strength can possibly take place, no matter for how long a time the powder may be kept.

I make a further improvement by putting the combination in packages, every one of which contains a sufficient quantity to aerate one pound of flour, and thus avoid an uncertainty of measurement by tea-spoons, which vary in size, and avoid the necessity of guessing at the quantity desired in the absence of a spoon. In almost every case inferior bread is the result of the uncertain strength and uncertain quantity of baking-powders. My improvements as herein set forth remedy the evil.

I make no claim to have originated the use of acid phosphate of lime, bicarbonate of soda, and starch or flour in the composition of baking-powders, as my invention is confined to the valuable improvements in combining these articles in layers or strata—that is, by placing the starch or flour between the acid phosphate of lime and the bicarbonate of soda—so as effectually to keep them separate until required for use, and also by packing the combination in a package sufficient and suitable to aerate one pound avoirdupois of flour.

The following are the proportions used by me in combination, as hereinafter mentioned, (by the metric system of weights,) for one pound avoirdupois of flour, viz: acid phosphate of lime, thirteen (13) grams; bicarbonate of soda, four and a half (4½) grams; powdered starch, four (4) grams.

My invention is equally applicable to other ingredients, the use of which in the composition of baking-powders I do not claim to be original with me—namely, cream of tartar, tartaric acid, citric acid, with bicarbonate of soda—and in proportion for one pound avoirdupois of flour, as follows, viz: tartaric acid, four (4) grams; cream of tartar, two (2) grams; bicarbonate of soda, five (5) grams; powdered starch, four (4) grams. The tartaric acid and cream of tartar are united together and placed in the package. Then the starch is placed and the bicarbonate of soda is finally placed on top; but of course it must be understood that this arrangement may be varied without making any important difference, provided, always, that the starch be between the acids and the soda. While I name powdered starch as the best article to use in separating acid from carbonate, yet any farinaceous article—such as the flour of grain—may be substituted in similar proportions with good results.

Having fully described my invention, what I claim, and desire to secure by Letters Patent, is—

As a new article of manufacture, a package of baking-powder in which until required for use the acid is separated from the carbonated alkali by a layer or stratum of powdered starch, all substantially as described.

WM. PITT CLOTWORTHY.

Witnesses:
GEO. W. BELL,
J. LEE SELEY.